United States Patent [19]

Meinel et al.

[11] Patent Number: 4,836,666
[45] Date of Patent: Jun. 6, 1989

[54] COMPENSATION FOR PRIMARY REFLECTOR WAVEFRONT ERROR

[75] Inventors: Aden B. Meinel; Marjorie P. Meinel, both of Pasadena; John E. Stacy, Canyon Country, all of Calif.

[73] Assignee: The United States of America as represented by the Administrator of the National Aeronautics and Space Administration, Washington, D.C.

[21] Appl. No.: 867,986

[22] Filed: May 29, 1986

[51] Int. Cl.[4] .................. G02B 23/06; G02B 17/00
[52] U.S. Cl. .................. 350/504; 350/443; 350/505; 350/620; 350/622
[58] Field of Search ............ 350/360, 442, 443, 504, 350/505, 611, 619, 620, 622, 503, 444, 537, 618

[56] References Cited

U.S. PATENT DOCUMENTS

| | | |
|---|---|---|
| 521,064 | 6/1894 | Vander Weyde . |
| 2,403,660 | 7/1946 | Hayward .................. 350/443 |
| 2,454,144 | 11/1948 | Epstein . |
| 2,703,506 | 3/1955 | Kelly . |
| 3,062,101 | 11/1962 | McCarthy .................. 350/505 |
| 3,274,886 | 9/1966 | Rosin .................. 350/505 |
| 3,501,226 | 3/1970 | Scott . |
| 3,521,943 | 7/1970 | Kelderman . |
| 3,524,698 | 8/1970 | Brueggeman .................. 350/443 |
| 3,527,526 | 9/1970 | Silvertooth . |
| 3,674,334 | 7/1972 | Offner .................. 350/505 |
| 3,811,749 | 5/1974 | Abel .................. 350/504 |
| 3,963,328 | 6/1976 | Abel .................. 350/619 |
| 4,013,353 | 3/1977 | Portner et al. . |
| 4,265,510 | 5/1981 | Cook .................. 350/505 |
| 4,342,503 | 8/1982 | Shafer .................. 350/443 |

FOREIGN PATENT DOCUMENTS 498588 3/1976 U.S.S.R. .................. 350/443

OTHER PUBLICATIONS

Applied Optics, vol. 11, No. 8, Aug. 1972 pp. 1814–1821, Adaptation of the Schupmann Medial Telescope to a Large Scale Astronomical Optical System, by John J. Villa.

Primary Examiner—Bruce Y. Arnold
Assistant Examiner—Ronald M. Kachmarik
Attorney, Agent, or Firm—Thomas H. Jones; John R. Manning; Charles E. B. Glenn

[57] ABSTRACT

In a telescope having primary and secondary reflectors, wherein the actual primary reflector surface deviates from an ideal primary reflector surface, such deviation is compensated for. At least one intermediate element forms an image of the primary surface onto the secondary surface, so each point on the secondary surface corresponds to a point on the primary surface. The secondary surface is formed with a deviation from an ideal secondary surface, with the "piston" distance of each point on the actual secondary surface equal to the piston distance of a corresponding point on the actual primary surface from the ideal primary surface. It is found that this results in electromagnetic (e.g., light) rays which strike a deviating area of the actual primary surface being brought to the same focus as if the actual primary surface did not have a deviation from an ideal primary surface.

8 Claims, 3 Drawing Sheets

COMPENSATION FOR PRIMARY REFLECTOR WAVEFRONT ERROR

ORIGIN OF THE INVENTION

The invention described herein was made in the performance of work under a NASA contract, and is subject to the provisions of Public Law 96-517 (35 USC 202) in which the Contractor has elected not to retain title.

BACKROUND OF THE INVENTION

A large telescope can include a large primary mirror or reflector and additional reflectors and/or lenses, for directing light from a distant object in front of the primary reflector onto an image plane at a focus. If the actual surface of the primary reflector deviates from the ideal surface, then light will not be accurately focused at the image plane. An ideal surface is one which, together with other ideal surfaces in the telescope, will bring on-axis rays of light (or other electromagnetic radiation for which it is designed) from the distant object accurately to the focus. Techniques are available for readily determining the deviation of an actual reflector surface from an ideal one. However, it is very expensive to form the surface of very large primary reflector, having a diameter of more than one meter, so objects separated by a fraction of an arc second are clearly separated at the focus. It would be easier to form the other, smaller optical elements of the telescope to compensate for regions of the primary reflector which deviate from the ideal primary reflector surface. However, it has heretofore been very difficult to calculate precisely what changes in other elements of the telescope, or additional elements, will correct the error in the primary reflector without creating additional errors. A relatively simple telescope system which enables correction for errors in the primary reflector, would facilitate the construction of high precision telescopes with large primary relfectors. Such corrections could be applied to electromagnetic imaging systems for a wide range of wavelengths.

SUMMARY OF THE INVENTION

In accordance with one embodiment of the present invention, a telescope or similar instrument is provided wherein a deviation of the primary reflector is compensated for. The telescope includes means for forming an image of the primary reflector onto a smaller auxiliary reflector of the telescope, so each point on the auxiliary reflector surface corresponds to a point on the primary reflector surface. The auxiliary reflector is formed with a deviation from an ideal auxiliariy reflector surface, which is conjugate to the deviation of the primary reflector surface from an ideal primary reflector surface. The conjugate deviation is such that each point on the auxiliary reflector surface has a "piston" shift equal but opposite to the corresponding point on the primary reflector surface.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
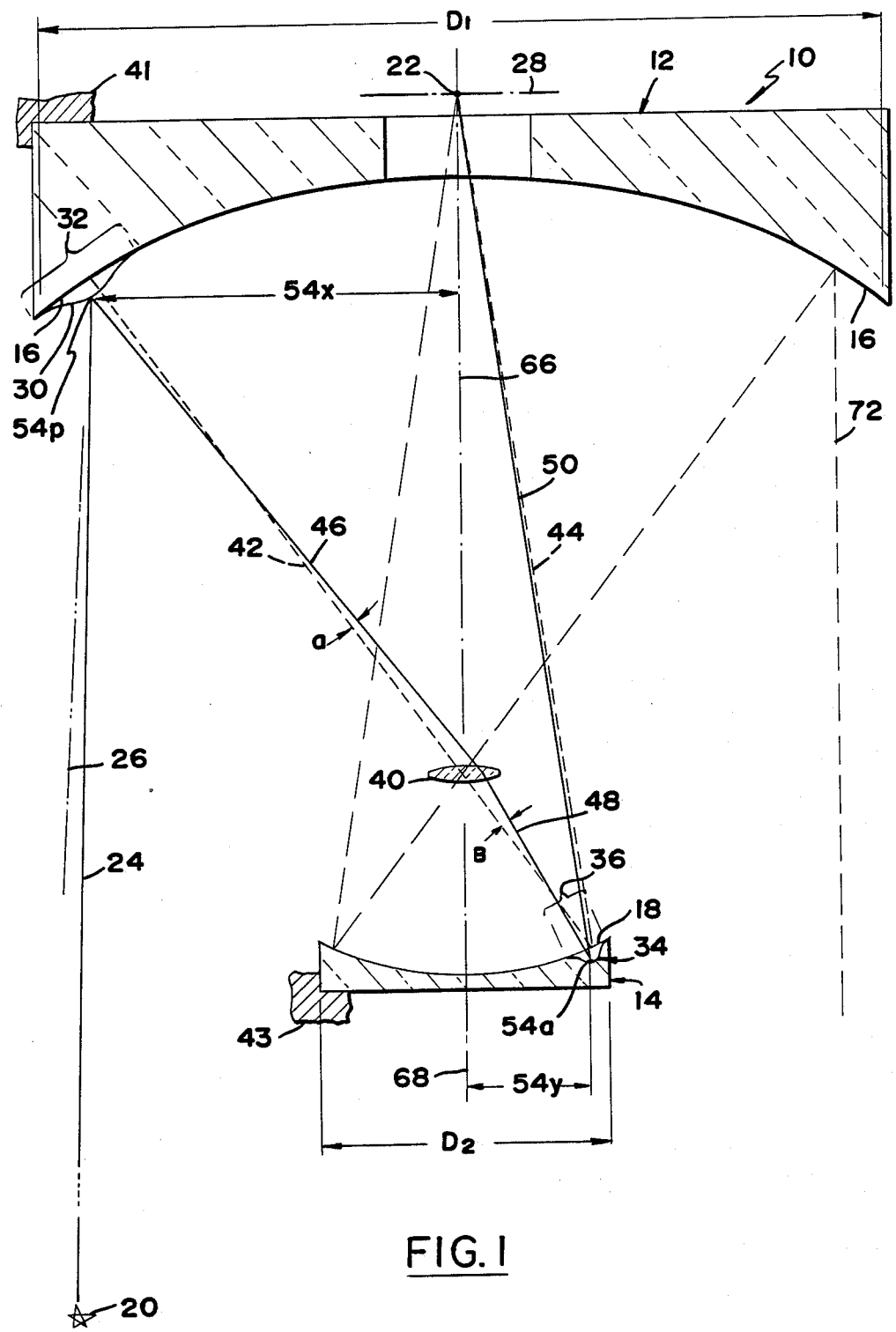
FIG. 1 is a simplified sectional view of a Gregorian telescope constructed in accordance with the present invention.

FIG. 1 illustrates a Gregorian type of telescope 10 which includes a substantially paraboloid primary mirror or reflector 12 and a hyperboloid secondary or auxiliary mirror or reflector 14 in front of the primary reflector. If the primary and auxiliary reflectors had ideal surfaces indicated at 16 and 18, then light from a distant object 20, such as a star in the field of view of the optical system, would be accurately focused at a focus 22. That is, on-axis rays such as 24 would be bought to the focus 22, while off-axis rays such as 26 would be focused at other points on an image location which form a surface such as a plane which includes the focus 22. In this particular case, a film indicated at 28 is to be exposed, while in other cases an eyepiece or electronic imaging device is in a poistion to enable viewing by an observer.

In the telescope of FIG. 1, the primary reflector has an actual surface 30 which is approximately the same and coincident with the ideal surface 16, but the actual primary reflector surface 30 deviates from the ideal surface 16 over a deviation area 32. The deviation in the area 32 is sufficient to seriously affect the image at the film 28. Applicant compensates for the deviation in the primary reflector by constructing the actual surface 34 of the auxiliary reflector so it deviates over an area 36 from the ideal auxiliary reflector surface 18. In addition, applicant constructs the telescope to include an intermediate element 40 which serves as a means which forms an image of the actual primary reflector surface 30 onto the actual auxiliary reflector surface 34. (Actually, the actual and ideal surfaces are sufficiently close for each reflector that it does not matter whether the intermediate element 40 forms an image of the actual or ideal primary surface onto the actual or ideal auxiliary surface). The lens 40 and mirror supports 41, 43 act as a means for directing light from the ideal primary surface onto the ideal auxiliary surface along paths that carry the light precisely toward the focus. The lens 40 lies at a location where on-axis rays such as 24 and 72 from the ideal primary surface, cross, which is a distance in front of the primary reflector equal to its focal length.

As a result of the intermediate element or lens 40 forming an image of the primary surface onto the auxiliary one, there is a one-to-one correspondence between each point on the auxiliary surface with a point on the primary surface. It is therefore necessary only that each point on the actual auxiliary surface 34 at the deviation area 36 thereof, be positioned to direct an on-axis ray reflected from a corresponding point on the actual primary surface 30 so it reaches the focus 22. In FIG. 1, if the ray 24 were to strike the ideal primary surface 16, then that ray would pass along the ideal path portion 42 to the ideal auxiliary surface 18. The ray would then be reflected along the ideal path portion 44 to the focus 22. Because of the deviation of the actual primary surface from the ideal one, the ray 24 will be reflected along an actual path portion 46. However, the lens 40 will direct the actual ray passing along the path portion 46 into the path portion 48. The ray will strike a point on the actual auxiliary surface 34 which will direct the ray along an actual final path portion 50 which is substantially coincident with the ideal final path portion 44.

Figure 3:
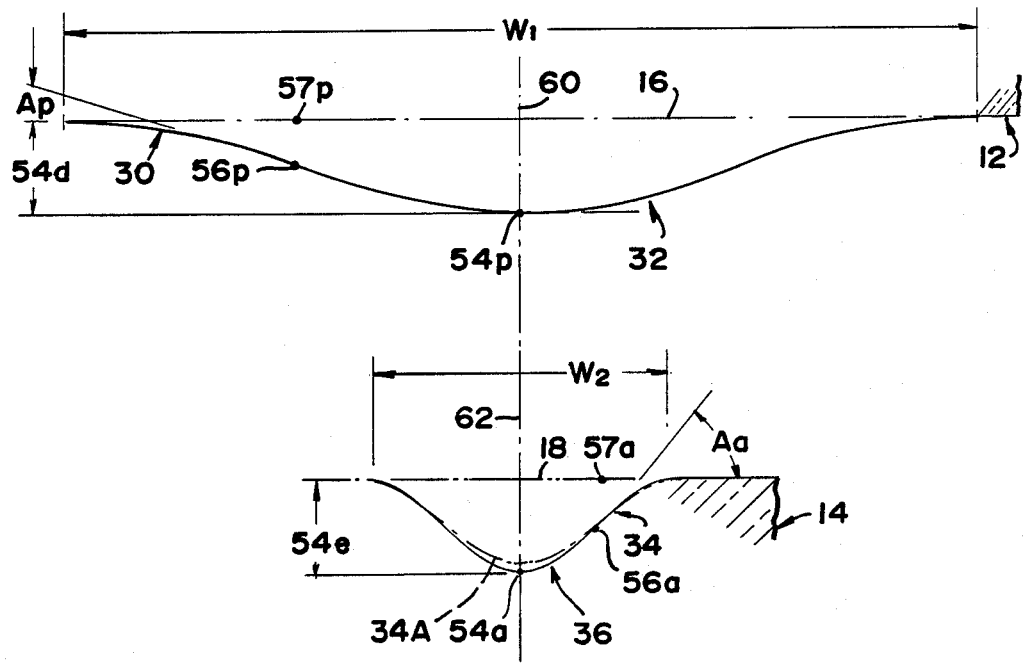
FIG. 3 is an enlarged illustration of portions of the primary and auxiliary reflectors of FIG. 1.

Applicant has found that the shape of the actual surface 34 in the deviation area 36 thereof can be computed in a relatively simple manner. FIG. 3 illustrates the deviation areas 32 and 36 of the actual primary and auxiliary reflector surfaces, and shows them in relation to the corresponding ideal primary and auxiliary surfaces 16, 18. Points such 54p, 56p on the actual primary surface 30 correspond to the points such as 54a, 56a on the actual auxiliary surface. A light ray striking the primary surface point 54p will be directed onto the auxiliary surface point 54a. The point 54p on the primary mirror has a piston deviation 54d from the ideal surface 16 as measured along an imaginary line 60 that is normal to the ideal surface. Applicant has found that a corresponding point 54a on the auxiliary surface should be positioned at a piston distance 54e from the ideal auxiliary surface 18, as measured along a line 62 that is normal to the ideal auxiliary surface 18. Applicant has found that a precision correction is obtained by positioning the points so that the pistion deviation 54e of the auxiliary surface point equals the piston deviation 54d of the corresponding primary surface point. The same equality should exist for all other corresponding paris of points on the primary for all other corresponding pairs of points on the primary and auxiliary surfaces. While the piston deviations 54d, 54e are equal, they are opposite in sign in that when the primary deviation 32 is positive (beyond the ideal surface 16), the auxiliary deviation is negative (below the ideal surface 18) and vice versa.

It may be noted that the diameter $D_2$ FIG. 1) of the image on the secondary or auxiliary mirror is a predetermined fraction of the diameter $D_1$ of the area on the primary mirror from which rays are received. In the drawing of FIG. 1, the ratio of $D_1$ to $D_2$ is 3, so the magnification M of the primary to the auxiliary is $D_1/D_2=3$. Any point such as 54p on the primary surface, which is spaced a distance 54x from the axis 66 of the primary mirror (its axis of symmetry), corresponds to a point 54a on the auxiliary mirror which is spaced a distance 54y from the axis 68 (of symmetry) of the secondary mirror, where $54x=54y\ D_1/D_2$, or $54yM$. Where the axes of the primary and auxiliary mirrors are coincident, the points 54p and 54a lie in the same imaginary plane, on diametrically opposite sides of the mirror axes.

Figure 2:
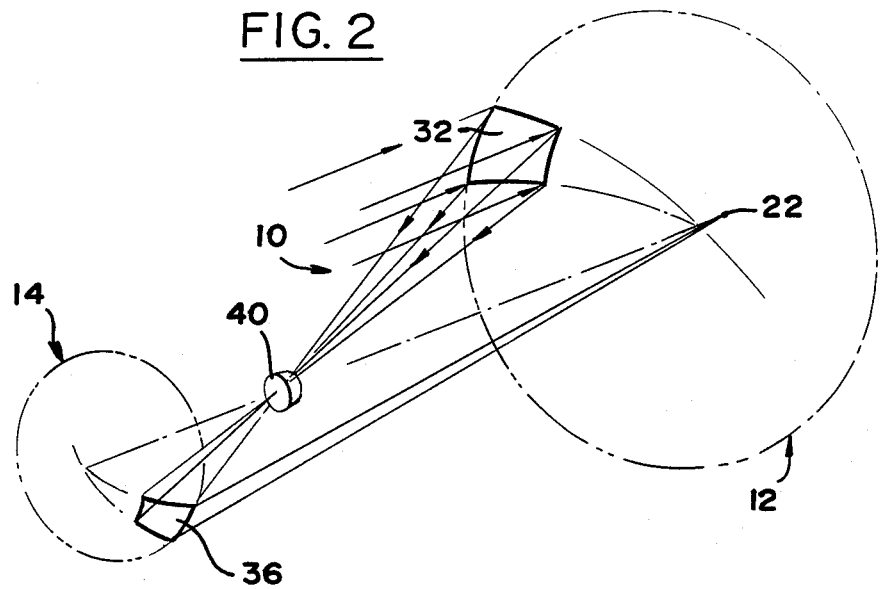
FIG. 2 is a simplified perspective view of the telescope of FIG. 1.

A point such as 56p (FIG. 3) on the actual primary surface extends at a slope or angle $A_p$ with respect to the adjacent ideal primary surface 16 (actually with respect to an adjacent point 57p on the ideal surface where both points 56p, 57p lie on a normal to the ideal surface). The corresponding auxiliary surface point 56a extends at a slope or angle $A_a$ from its adjacent ideal surface 18 (at ideal surface point 54a), where $A_a=A_pM$ (in absolute value). In FIGS. 1–3, where $M=3$, the angle $A_a$ is three times as great as the angle $A_p$. In FIG. 1, the angle "B" between the ideal ray path and the actual path portion following the intermediate lens 40 is three times the angle "a" between the ideal path and the actual path portion 46 prior to the lens. The fact that the angle $A_a$ in FIG. 3 is three times as great as the angle $A_p$, results in precise compensation for the increased angle produced by the intermedate lens 40. The result is that the actual light ray becomes coincident with the ideal light ray along their final path portions leading to the focus.

For small deviations of the actual primary surface from the ideal one, the distance along the ideal path portion at 42 and the actual path which is the addition of the two path portions 46, 48, is substantially the same. This results largely from the fact that the piston deviations between corresponding points such as 54p and 54a on the primary and auxiliary surfaces are equal and opposite.

It should be noted that there are secondary effects arising from the above-mentioned error-correcting approach. One effect is that the actual light ray will be brought to a focus that is slightly in front of or behind the ideal focus. This effect is small for small deviations of the actual primary reflector surface from the ideal. If it is desired to minimize this effect, this can be accomplished by refocusing the deviation area of the auxiliary reflector. In FIG. 3, this would involve slightly "flattening" the auxiliary surface, as to the configuration indicated at 34A. Even with secondary effects minimized, the deviation such as 54e of a point on the actual auxiliary surface will be between 75% and 125% of the deviation 54d of a corresponding point on the primary surface, at locations such as 54p, 54e where the deviations are greatest. Similarly, the angle $A_a$ will be between 75% and 125% of M times the angle $A_p$. Thus, the deviations of points on the auxiliary surface will be substantially equal to the deviations of corresponding points on the primary surface. In a typical case, the deviation 54e of a point such as 54a will be between 90% and 110% of the deviation of a corresponding point on the primary reflector surface.

Prior large primary mirrors can be readily formed close to the ideal surface, so corrections for primary surface deviations by corresponding auxiliary surface piston deviations results in minimal secondary effects. Since a major cost has arisen from correcting small errors, the correction technique of the present invention is useful in saving a considerable sum in correcting for small errors in large mirrors. It may be noted that the lens 40 does not affect light rays reflected from portions of the primary mirror where it is coincident with the ideal primary mirror, so the addition of the lens 40 does not greatly change the design of the telescope.

Figure 4:
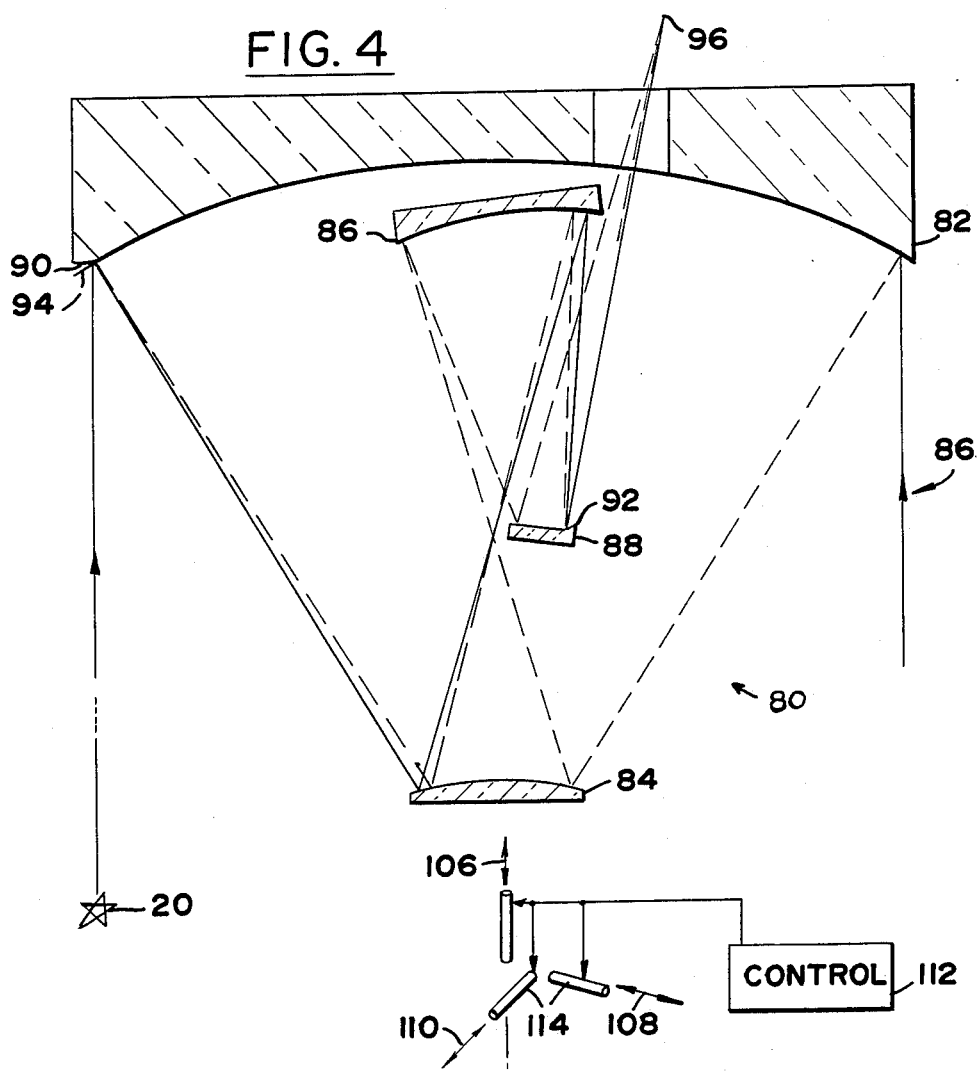
FIG. 4 is a simplified sectional view of a modified Cassegrain telescope constructed in accordance with the present invention.

FIG. 4 illustrate another telescope 80 of the Cassegrain type. The telescope includes a concave, parabolic Cassegrain telescope primary mirror 82 which reflects electromagnetic radiation from a distant object in its field of view toward a convex hyperbolic secondary mirror 84 that is positioned in front of the primary. The secondary mirror reflects light to a tertiary concave mirror 86 which reflects the light to a quaternary or auxiliary mirror 88. The secondary and tertiary mirrors 84, 86 (which form an intermediate optical element) form an image of the actual primary mirror or reflector surface 90 onto an actual surface 92 of the auxiliary reflector 88. Thus, every point on the actual auxiliary reflector surface 92 corresponds to a point on the actual primary reflector surface 90. In FIG. 4, the actual primary surface 90 deviates from an ideal primary surface 94. The actual auxiliary surface 92 deviates from an ideal secondary surface which, in conjuction with the ideal primary surface would form an image of on-axis rays of the object 20 at a focus 96. The actual auxiliary surface 92 deviates from the ideal auxiliary surface in that every point on the actual auxiliary surface has a piston deviation substantially equal and opposite to the piston deviation of a corresponding point of the actual primary surface. It may be noted that a typical prior art Cassegrain telescope does not include mirrors at the positions of the tertiary and quaternary reflectors 86, 88, but instead includes a correcting lens or nothing at all.

In one system that has been designed for a 20 meter aperture size telescope similar to that of FIG. 4, the elements have the following characteristics:

| No. of surface | RD (radius of curvature) | TM (separation between surfaces) | CC (conic constant) |
|---|---|---|---|
| 1 - primary | −24787.6 | −11418.80 | −0.987179 |
| 2 - secondary | −2399.6 | 10831.27 | −1.85967 |
| 3 - tertiary | −7614.1 | −5601.91 | −0.772203 |
| 4 - quaternary | −39910.6 | 8916.48 | 0.0 | where the units are in millimeters and "CC" stands for "conic constant" which defines the surface. The surface deformation is:

$$Z = \frac{r^2/R}{1 + \sqrt{1 - (CC + 1)(r/R)^2}}$$

where Z is the deviation of each point on the ideal surface from a plane normal to the surface axis, R is the radius of curvature of the corresponding point, and r is the radius, along an imaginary line that is normal to the surface axis, from the surface axis to a point on the surface. The primary reflector 82 had a shape which was nearly that of a paraboloid, the secondary reflector 84 had the surface of a hyperboloid, the tertiary reflector 86 had the surface of an ellipsoid, and the auxiliary reflector had the surface of a flat mirror (except at the deviation area).

Figure 5:
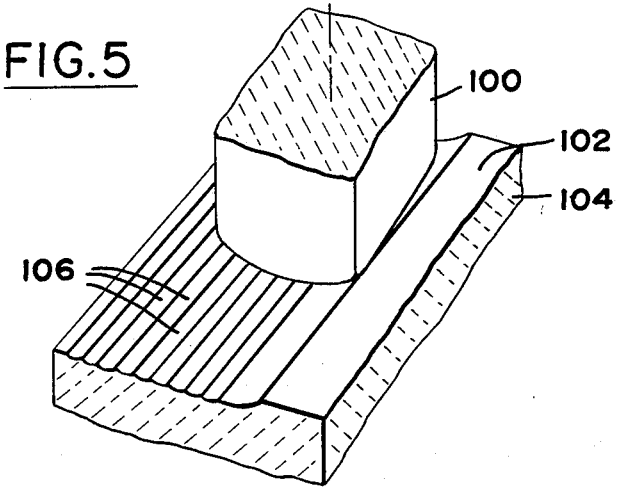
FIG. 5 is a simplied perspective view showing one method for forming a deviation in a auxiliary reflector of FIG. 1.

The auxiliary reflector can be constructed in a number of ways. Applicant has found that the construction can be obtained by the method indicated in FIG. 5, where a diamond cutting tool 100 moves across the surface 102 of a auxiliary reflector 104 to remove material therefrom in extremely fine cuts 106 which have a width which is a fraction of the wavelength of light reflected by the reflector. The diamond cutting tool 100 is controlled in its movements, indicated by arrows 106–110, by a computer control which energizes transducers 114.

The telescopes of the present invention are useful for reflecting electromagnetic radiation, sometimes herein referred to as light, of a wide range of wavelengths. The range includes ultraviolet and smaller wavelengths, through visible and infrared wavelengths, through microwave and radio wavelengths. For longer wavelengths, there previously has not been a problem in accurately forming the primary reflector surface. Therefore, the invention is especially useful for reflectors that are used for shorter wavelengths.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An instrument comprising:

an actual primary reflector having a surface approximately the same, and approximately coincident with, the surface of an ideal primary reflector;

an actual auxiliary reflector having a surface approximately the same and approximately coincident with the surface of an ideal auxiliary reflector;

means for directing electromagnetic radiation, said means being constructed so it can direct said radiation from said ideal primary surface onto said ideal auxiliary surface and from said ideal auxiliary surface precisely toward a focal point, but wherein the actual primary and auxiliary reflector surfaces each deviates from the ideal primary and auxiliary reflector surface, the ideal primary and auxiliary surfaces having a cross-section which is precisely symmetrical about an axis, but the real primary and auxiliary surfaces having a corresponding cross-section which is not symmetrical about a corresponding axis;

said directing means substantially forms an image of said actual primary reflector onto said actual auxiliary reflector, with each real point on the actual primary reflector corresponding to an imaged point on the actual auxiliary reflector; and each imaged point on the actual auxiliary reflector lies a distance away from said ideal auxiliary reflector along a line normal to the ideal auxiliary reflector and intersectin the ideal auxiliary reflector at a corresponding normal point, said distance being substantially equal to the distance between each corresponding real point on the actual primary reflector and the ideal primry reflector surface along a line normal to the ideal primry reflector surface and intersecting the ideal primary reflector at a corresponding normal point.

2. The instrument described in claim 1 wherein:

said actual primary reflector forms a concave Gregorian telescope primary mirror which reflects electgromagnetic radiation from objects in front of the actual primary reflector;

said actual auxiliary reflector forms a concave Gregorian telescope secondary mirror located in front of saaid primary mirror;

said directing means comprises a lens located between the actual primary and secondary reflectors, and located in front of said ideal primary reflector surface a distance equal to the focal length of the actual primary reflector, the focal length of said lens being chosen so it forms an image of the actual primary reflector onto the actual secondary reflector.

3. The instrument described in claim 1 wherein:

said actual primary reflector forms a concave Cassegrain telescope primary mirror which reflects electromagnetic radiation from objects in front of the actual primary reflector;

said directing means includes a Cassegrain telescope secondary mirror positioned in the field of view of said Cassegrain primary mirror to receive radiatin therefrom, and a tertiary mirror positioned behind said secondary mirror to receive radiation therefrom and direct said radiation toward said auxiliary reflector to a focus;

said secondary and tertiary mirrors forming an image of said actual primary reflector onto said actual auxiliary reflector.

4. The instrument described in claim 1 wherein:
said directing means forms an image of an area of said actual primary reflector, which has a first diameter, onto an area of said auxiliary reflector, which has a second diameter, the first diameter divided by the second diameter equalling a ratio M;
the slope of the reflective surface at each of a multiplicity of imaged points on said actual auxiliary reflector surface, with respect to the slope at each of a multiplicity of corresponding normal points on the ideal auxiliary surface, substantially equals M times the slope of the reflective surface at each of a multiplicity of corresponding real points on said actual primary reflector surface with respect to the slope at each of a multiplicity of corresponding normal points on the ideal primary reflector surface.

5. In a telescope which includes a large primary reflector, a smaller auxiliary reflector, and means for directing electromagnetic radiation from an object in the field of view of the primary reflector surface so the radiation reflects from the primry reflector to the auxiliary reflector and from the auxiliary reflector approximately toward an image location, and wherein the actual primary and auxiliary reflector surfaces have shapes which are close to respective primary and auxiliary ideal surfaces, which ideal surfaces would, together with said directing means, form an accurate image of an object in front of said primary reflector onto said image location, but wherein the actual primry reflector surface includes a primary deviation area which deviates from what would be the ideal primary reflector surface and wherein said ideal surface have cross-sections chosen from the group which includes parabolas, hyperbolas, circles, ellipses and flats, but the real primary and auxiliary surfaces have cross-sections which are not chosen from said group, the improvement wherein:
said means for directing is constructed to form an image of real points on said actual primary reflector surface onto said actual auxiliary reflector surface to form imaged points therein corresponding to said real points;
said auxiliary reflector has an actual auxiliary reflector surface which includes an auxiliary deviation at which said actual auxiliary reflector surface deviates from what would be the ideal auxiliary reflector surface;
said auxiliary reflector deviation having imaged points corresponding to real points on the primary deviation on the primary reflector, wherein said means for concentrating forms an image of each real primary deviation point onto an imaged auxiliary deviation point; and
each imaged auxiliaty deviation point is spaced a distance normal to what would be the ideal auxiliary reflector surface and to a normal point thereon by a distance equal to the distance of a corresponding real primary deviation point normal to what would be said ideal primary reflector surface and to a normal point thereon.

6. The improvement described in claim 5 wherein:
said means for directing forms an image of an area of said primary reflector which has a first diameter onto an area of said auxiliary reflector which has a second diameter, the first diameter divided by said second diameter being equal to a ratio M;
the slope of the reflecive surface at each of a multiplicity of imaged points on said auxiliary reflector deviation with respect to the slope at the corresponding normal points on what would be the ideal auxiliary surface, equals the slope of the reflective surface at each of a multiplicity of corresponding real points on said primary reflector deviation with respect to the slope at the corresponding normal points on what would be the ideal primary reflector multiplied by M.

7. An instrument comprising:
an actual primary reflector having a surface approximately the same, and approximately coincident with, the surface of an ideal primary reflector, the surface of the ideal primary reflector having a cross-section which is one of a group of surfaces that consists of parabolas, hyperbolas, circles, ellipses, and flats, but the actual primary reflector surface deviating from said ideal surface so the actual primary reflector surface has a cross-section which is not one of said group of surfaces;
an actual auxiliary reflector having a surface approximately the same and approximately coincident with the surface of an ideal auxiliary reflector but deviating therefrom;
means for directing electromagnetic radiation, which is constructed so it can direct said radiation from said ideal primary surface onto said ideal auxiliary surface and from said ideal auxiliary surface precisely toward a focal point, but wherein the actual primary and auxiliary reflector surfaces each deviates from the ideal primary and auxiliary reflector surfaces;
said means substantially forms an image of said actual primary reflector onto said actual auxiliary reflector, with each real point on the actual primary reflector corresponding to an imaged point on the actual auxiliary reflector; and
each of a multiplicity of imaged points on the actual auxiliary reflector lies a distance away from said ideal auxiliary reflector along a line normal to the ideal auxiliary reflector and interesting the ideal auxiliary reflector at a corresponding normal point, said distance being substantially equal to the distance between each corresponding real point on the actual primary reflector and the ideal primary reflector surface along a line normal to the ideal primary reflector surface and intersecting the ideal primary reflector at a corresponding normal point.

8. In a telescope which includes a large primary reflector, a smaller auxiliary reflector, and means for directing electromagnetic radiation from an object in the field of view of the primary reflector surface so the radiation reflects from the primary reflector to the auxiliary reflector and from the auxiliary reflector approximately toward an image location, and wherein the actual primary and auxiliary reflector surfaces have shapes which are close to respective primary and auxiliary ideal surfaces, which ideal surfaces would, together with said directing means, form an accurate image of an object in front of said primary reflector onto said image location, but wherein the actual primary reflector surface includes a primary deviation area which deviates from what would be the ideal primary reflector surface, and wherein the ideal primary and auxiliary surfaces each have a cross-section which is precisely symmetrical about an axis, but the real primary and auxiliary surfaces each have a corresponding cross-section which is not symmetrical about a corresponding axis, the improvement wherein:

said means for directing is constructed to form an image of real points on said actual primary reflector surface onto said actual auxiliary reflector surface to form imaged points therein corresponding to said real points;

said auxiliary reflector has an actual auxiliary reflector surface which includes an auxiliary deviation at which said actual auxiliary reflector surface deviates from what would be the ideal auxiliary reflector surface;

said auxiliary reflector deviation having imaged points corresponding to real points on the primary deviation on the primary reflector, wherein said means for concentrating forms an image of each real primary deviation point onto an imaged auxiliary deviation point; and each imaged auxiliary deviation point is spaced a distance normal to what would be the ideal auxiliary reflector surface by a distance equal to the distance of a corresponding real primary deviation point normal to what would be said ideal primary reflector surface.

* * * * *